United States Patent [19]

Igarashi et al.

[11] Patent Number: 5,310,805
[45] Date of Patent: May 10, 1994

[54] POLYVINYL CHLORIDE RESIN COMPOSITION FOR POWDER MOLDING

[75] Inventors: Toshio Igarashi, Kyoto; Akira Wakatsuki, Ibaraki; Yuu Shida, Takatsuki, all of Japan

[73] Assignee: Sumitomo Chemical Company, Limited, Osaka, Japan

[21] Appl. No.: 964,862

[22] Filed: Oct. 22, 1992

[30] Foreign Application Priority Data

Oct. 28, 1991 [JP] Japan .................................. 3-281309

[51] Int. Cl.$^5$ ............................................. C08L 33/06
[52] U.S. Cl. .................................... 525/239; 525/70; 525/85; 525/227; 525/240; 525/317; 524/569; 524/567; 524/297
[58] Field of Search ................. 525/239, 240, 227, 85, 525/317

[56] References Cited

U.S. PATENT DOCUMENTS 4,659,764  4/1987  Isao et al. ............................ 524/399

FOREIGN PATENT DOCUMENTS 161456     9/1984  Japan .
60-090221  5/1985  Japan .
90221      5/1985  Japan .

Primary Examiner—James J. Seidleck
Assistant Examiner—Mary Critharis
Attorney, Agent, or Firm—Wenderoth, Lind & Ponack

[57] ABSTRACT

Disclosed is a polyvinyl chloride resin powder composition for rotational molding, which is prepared by dry-blending a plasticizer and a stabilizer with a polyvinyl chloride resin followed by incorporating from 0.1 to 5 parts by weight, to 100 parts by weight of the polyvinyl chloride resin, of a finely divided polyvinyl chloride resin having a viscosity average polymerization degree of from 2000 to 5000 into the resulting dry blend. Also disclosed is a method of producing a molded article by subjecting the composition to rotational molding. The composition has good powder flowability for rotational molding, and the molded article from the composition is free from pin holes and blocks on the surface thereof.

16 Claims, No Drawings

POLYVINYL CHLORIDE RESIN COMPOSITION FOR POWDER MOLDING

This invention relates to a polyvinyl chloride resin powder composition for rotational molding, which contains a specified amount of a finely divided polyvinyl chloride resin having a specified viscosity average polymerization degree, and to a method of producing a molded article from it by rotational molding.

Heretofore, articles which need a mold with a narrow opening for molding them, for example, hollow articles such as car parts of arm rests or head rests and toys of dolls or balls have been produced by a rotational molding method of using a paste sol, in which a composition having the same weight as that of the article to be molded therefrom is fed into a mold having a room temperature or having been heated up to a temperature not lower than the melting point of the composition, the mold is heated with rotating it with a multi-spindle so that the composition is fused to the inner surface of the mold, then the mold is cooled and the shaped article is released from the mold.

However, in accordance with the rotational molding method of using a paste sol, fusion of the paste sol in the mold is rapid, since the gelation temperature of the paste sol is low, to cause flow marks and lips and also cause a phenomenon of shringiness of the sol. As a result, the articles to be obtained by the method have drawbacks that they are lacking in the surface smoothness or the thickness of the covering material over them becomes large.

Use of a paste sol needs much labor for color change or for cleaning tanks and pipes and the viscosity thereof varies with the lapse of time, so that it involves various problems that it is not durable to storage for a long period of time and that the quality of the products therefrom is not stable.

On the other hand, as a method of producing open type products which need a mold having a broad opening for producing them, such as car interior parts of crash pads, consoles, meter covers or door trims, a powder molding method of using a powdery resin composition, especially a powder slush molding method has been the mainstream, in which a powder composition of an excess amount over the weight of the product to be formed therefrom is fed into a mold as heated up to a temperature not lower than the melting point of the composition, the composition is fused to the inner surface of the mold with rotating or swinging the mold with a single spindle, and thereafter the non-fused powder is discharged and recovered.

However, if such a powder slush molding method is applied to hollow articles which need a mold having a narrow opening for producing them, there are various problems that feeding of a powder composition into a mold and recovery of the same therefrom are difficult and that a part of the powder composition as fed into a mold could not be fused by rotation with a single spindle.

Where rotational molding is carried out, using a power composition which is used in powder molding such as powder slush molding, for example, a powder composition as prepared by incorporating a finely divided polyvinyl chloride resin or calcium carbonate into a dry blend comprising a polyvinyl chloride resin and additives such as plasticizer, stabilizer and pigment (Rubber Digest 14, [8]32–40 (1962); Japanese Patent Kokoku 1575/1962; Japanese Patent Kokai 161456/1984), in place of a paste sol, many pin holes are formed on the surface of the product or the powder composition is blocked in the mold and, as a result, there are various problems of lack of the covering material of the product and of poor smoothness of the back surface of the product.

Under the situation, the present inventors earnestly investigated for the purpose of finding out a power composition suitable for rotational molding and, as a result, have found that a powder composition containing a specified amount of a finely divided polyvinyl chloride resin having a specific viscosity average polymerization degree has good powder flowability and is free from blocking in a mold to be molded into a product with no pin holes. After further investigation of the finding, they have completed the present invention.

Specifically, the present invention provides a polyvinyl chloride resin powder composition for rotational molding, which is prepared by dry-blending a plasticizer and a stabilizer with a polyvinyl chloride resin followed by incorporating from 0.1 to 5 parts by weight, to 100 parts by weight of the polyvinyl chloride resin, of a finely divided polyvinyl chloride resin having a viscosity average polymerization degree of from 2000 to 5000 into the resulting dry blend. It also provides a method of producing a molded article by subjecting the composition to rotational molding.

The present invention will be explained in detail hereunder.

The present invention uses a finely divided polyvinyl chloride resin having a high polymerization degree, which is not used generally. Specifically, the resin has a viscosity average polymerization degree of from 2000 to 5000, preferably from 3000 to 4000, more preferably from 3500 to 4000.

If a resin having a viscosity average polymerization degree of less than 2000 is used, the article to be molded would have many pin holes. In addition, the powder composition would solidify to cause so-called blocking under heat as fusion of it is too rapid. As a result, the product would involve lack of the covering material, or the blocked solids would fuse to the back surface of the product to worsen the smoothness of the back surface thereof. If, on the contrary, a resin having a viscosity average polymerization degree of more than 5000 is used, fusion of all the particles of the resin would be retarded to cause formation of pin holes in the product because the resin would contain crosslinked particles or so-called geled ones having a high melting point.

The finely divided polyvinyl chloride resin for use in the present invention includes, for example, a finely divided vinyl chloride polymer and a finely divided copolymer of monomer(s) capable of copolymerizing with vinyl chloride, such as ethylene, propylene or vinyl acetate, and vinyl chloride. The average particle size of the resin is generally approximately from 0.1 to 10 μm. Such a finely divided polyvinyl chloride resin may be produced by any known polymerization method such as an emulsion polymerization method or a microsuspension polymerization method.

The finely divided polyvinyl chloride resin is incorporated into the powder composition in an amount of from 0.1 to 5 parts by weight, preferably from 1 to 3 parts by weight, to 100 parts by weight of the base polyvinyl chloride resin. If the amount is less than 0.1 part by weight, the powder flowability would worsen so that the power composition could not be molded by rotational molding. If, on the contrary, it is more than 5 parts by weight, the fusability of the powder composition would worsen though the powder flowability thereof is improved, so that pin holes would be formed in the molded product.

The base polyvinyl chloride resin for use in the present invention includes, for example, vinyl chloride polymer; copolymers of monomer(s) capable of copolymerizing with vinyl chloride, such as ethylene, propylene, vinyl acetate, alkyl acrylates or alkyl methacrylates, and vinyl chloride; and graft copolymers formed by grafting vinyl chloride to ethylene-vinyl acetate copolymers. These polyvinyl chloride resins may be produced, for example, by suspension polymerization or bulk polymerization. The average particle size of the base resin is generally approximately from 100 to 500 µm.

The plasticizer for use in the present invention includes, for example, phthalates such as di-2-ethylhexyl phthalate, diisononyl phthalate, diisodecyl phthalate, diisoundecyl phthalate and mixed dialkyl phthalate where the alkyl group moiety has from 9 to 11 carbon atoms; trimellitates such as trioctyl trimellitate, tri-2-ethylhexyl trimellitate, tridecyl trimellitate and mixed trialkyl trimellitate where the alkyl group moiety has from 7 to 11 carbon atoms; and adipates such as di-2-ethylhexyl adipate and diisodecyl adipate. These may be used singly or as a mixture of two or more of them. Only a small amount of an epoxy plasticizer and a polyester plasticizer may be used along with them.

The amount of the plasticizer to be in the composition of the present invention may be generally from 30 to 120 parts by weight to 100 parts by weight of the base polyvinyl chloride resin.

The stabilizer to be in the composition of the present invention may be any of Pb compound, Sn compound, Ba compound, Ca compound or Zn compound stabilizers. One or more of such known stabilizers may be added to the composition. They may be selected suitable in accordance with the use and the necessary characteristic of the composition. In addition, the composition of the present invention may also contain a phenolic or thioether antioxidant, a phosphite compound, a diketo compound, a light stabilizer such as hindered amines, salicylates, benzophenones and benzotriazoles, as well as an epoxidized soybean oil or an epoxy compound to be produced by bisphenol A and epichlorohydrin.

The amount of the stabilizer to be in the composition may be generally from 0.1 to 10 parts by weight to 100 parts by weight of the base polyvinyl chloride resin.

The composition of the present invention may be produced, for example, by adding a plasticizer and a stabilizer to a base polyvinyl chloride resin with heating and stirring it with a super mixer, when the temperature of the resin has become up to 70° to 90° C., then cooling the resulting composition when the temperature of the composition has become up to 110° to 130° C., followed by uniformly dispersing a finely divided polyvinyl chloride resin into the composition when it has been cooled to 70° to 40° C.

The composition of the present invention may optionally contain other various additives such as filler, pigment and mold release agent, in addition to the above-mentioned components.

As mentioned above, the polyvinyl chloride resin powder composition of the present invention is obtained. The powder composition still has good powder flowability even when it is applied to rotational molding without causing blocking in a mold, and it may be molded into articles with no pin hole.

The present invention will be explained in more detail by way of the following examples and comparative examples, which, however, are not intended to restrict the scope of the present invention.

EXAMPLE 1

100 parts by weight of polyvinyl chloride resin (Sumilit Sx-7G, trade name by Sumitomo Chemical Co.; viscosity average polymerization degree, 750) was put in a super mixer and stirred therein under heat at a constant rotation speed. After the resin temperature became 80° C., 60 parts by weight of plasticizer di-2-ethylhexyl phthalate (DOP), 4 parts by weight of epoxidized soybean oil, 3 parts by weight of Ca—Zn compound stabilizer and a small amount of pigment were added thereto and dry-blended.

After the composition reached 120° C., this was cooled. After the temperature became 50° C. or lower, 3 parts by weight of finely divided polyvinyl chloride resin (Sumilit Px-U, trade name by Sumitomo Chemical Co.; viscosity average polymerization degree, 3000; average particle size, about 1 µm) was uniformly dispersed to obtain a powder composition.

EXAMPLE 2

A powder composition was obtained in the same manner as in Example 1, except that a different finely divided polyvinyl chloride resin (Sumilit Px-QHH, trade name by Sumitomo Chemical Co.; viscosity average polymerization degree, 3600; average particle size, about 1 µm) was used in place of the finely divided polyvinyl chloride resin (viscosity average polymerization degree 3000; average particle size, about 1 µm) of Example 1.

COMPARATIVE EXAMPLE 1

A powder composition was obtained in the same manner as in Example 1, except that the finely divided polyvinyl chloride resin of Example 1 was not used.

COMPARATIVE EXAMPLE 2

A powder composition was obtained in the same manner as in Example 1, except that 6 parts by weight of the same finely divided polyvinyl chloride resin as that used in Example 1 was used, in place of 3 parts by weight of the same in Example 1.

COMPARATIVE EXAMPLE 3

A powder composition was obtained in the same manner as in Example 1, except that 10 parts by weight of the same finely divided polyvinyl chloride resin as that used in Example 1 was used, in place of 3 parts by weight of the same in Example 1.

COMPARATIVE EXAMPLE 4

A powder composition was obtained in the same manner as in Example 1, except that a different finely divided polyvinyl chloride resin (Sumilit Px-QHT, trade name by Sumitomo Chemical Co.; viscosity average polymerization degree, 1800; average particle size, about 1 µm) was used in place of the finely divided polyvinyl chloride resin (viscosity average polymerization degree 3000; average particle size, about 1 µm) of Example 1.

COMPARATIVE EXAMPLE 5

A powder composition was obtained in the same manner as in Example 1, except that a different finely divided polyvinyl chloride resin (Sumilit Px-QLT, trade name by Sumitomo Chemical Co.; viscosity average polymerization degree, 800; average particle size, about 1 μm) was used in place of the finely divided polyvinyl chloride resin (viscosity average polymerization degree 3000; average particle size, about 1 μm) of Example 1.

Each powder composition as obtained in the previous Examples 1 and 2 and Comparative Examples 1 to 5 was molded by rotational molding of the process mentioned below.

Precisely, 250 g of each powder composition as obtained in the previous examples and comparative examples was put in a mold for molding head rest, and the mold was set in a heating oven having a settled ambient temperature of 250° C. The mold was then heated for 12 minutes by biaxial rotation comprising 10 rotations on its own axis and 10 external revolutions. Afterwards, the mold was cooled and the molded article was released therefrom. The article was evaluated in the manner mentioned below

(1) Powder Flowability

The powder flowability (easiness of filling in the mold) of the prepared powder composition was evaluated, when it was put into the mold from a cup. The results are shown in Table 1 below.

◯: The powder flowability was good and the composition could be filled in the mold with no difficulty.

Δ: The powder flowability was not so good but the composition could be filled in the mold.

×: The powder flowability was bad and the composition could not be filled in the mold.

(2) Formation of Pin Holes

The surface of the molded article was visually observed, and the degree of formation, if any, of pin holes thereon was checked. The results are shown in Table 1.

⊚: No pin hole formed.
◯: Only a few pin holes formed.
Δ: Some pin holes formed.
×: Many pin holes formed

(3) Anti-blocking Property

The degree of formation, if any, of blocks (blocked solids) on the back surface of the molded article was checked. The results are shown in Table 1.

◯: No blocking admitted.
Δ: Some blocks formed.
×: Many blocks formed.

|  | Example | | Comparative Example | | | | |
|---|---|---|---|---|---|---|---|
|  | 1 | 2 | 1 | 2 | 3 | 4 | 5 |
| Viscosity average polymerization degree of finely divided polyvinyl chloride resin |  |  |  |  |  |  |  |
| 3000 | 3 |  | 0 | 6 | 10 |  |  |
| 3600 |  | 3 |  |  |  |  |  |
| 1800 |  |  |  |  |  | 3 |  |
| 800 |  |  |  |  |  |  | 3 |
| Powder Flowability | ◯ | ◯ | × | ◯ | ◯ | ◯ | ◯ |
| Formation of Pin Holes on the Surface of Molded Article | ◯ | ⊚ | — | Δ | × | × | × |
| Anti-blocking Property | ◯ | ◯ | — | ◯ | ◯ | Δ | × |

(Note)
The powder composition of Comparative Example 1 could not be molded, since the powder flowability thereof was bad.

COMPARATIVE EXAMPLE 6

The powder composition obtained in Example 1 was molded by slush molding of the process mentioned below.

Precisely, an embossed nickel flat mold having a size of 300 mm × 300 mm and a thickness of 3 mm was heated so that the mold temperature was 230° C., and immediately the powder composition was sprinkled over the mold to adhere thereto for 10 seconds. Then, the non-fused powder of the composition was discharged from the mold, and the powder-fused mold was heated in a heating oven having an ambient temperature of 280° C. for one minute where the powder fused. Next, the mold was cooled and the molded article was released therefrom. The condition of the surface (embossed surface) of the article was observed. The molded article had many pin holes on the whole surface thereof and could not be put to practical use.

What we claim is:

1. A polyvinyl chloride resin powder composition for rotational molding, which is prepared by dry-blending a plasticizer and a stabilizer with a polyvinyl chloride resin followed by incorporating from 1 to 5 parts by weight, to 100 parts by weight of the polyvinyl chloride resin, of a finely divided polyvinyl chloride resin having a viscosity average polymerization degree of from 3000 to 4000 into the resulting dry blend.

2. The composition as claimed in claim 1, in which the finely divided polyvinyl chloride resin is one having a viscosity average polymerization degree of from 3500 to 4000.

3. The composition as claimed in claim 1, in which the finely divided polyvinyl chloride resin is one having an average particle size of approximately from 0.1 to 10 μm.

4. The composition as claimed in claim 1, in which the finely divided polyvinyl chloride resin is a finely divided vinyl chloride polymer or a finely divided copolymer composed of monomer(s) capable of copolymerizing with vinyl chloride, selected from the group consisting of ethylene, propylene or vinyl acetate, and vinyl chloride.

5. The composition as claimed in claim 1, in which the finely divided polyvinyl chloride resin is one as prepared by emulsion polymerization or microsuspension polymerization.

6. The composition as claimed in claim 1, in which the polyvinyl chloride resin is a vinyl chloride polymer, or a copolymer composed of monomer(s) capable of copolymerizing with vinyl chloride, selected from the group consisting of ethylene, propylene, vinyl acetate, alkyl acrylates or alkyl methacrylates, and vinyl chloride, or a graft copolymer formed by grafting vinyl chloride to an ethylene-vinyl acetate copolymer.

7. The composition as claimed in claim 1, in which the polyvinyl chloride resin is one as prepared by suspension polymerization or bulk polymerization.

8. The composition as claimed in claim 1, in which the polyvinyl chloride resin is one having an average particle size of approximately from 100 to 500 μm.

9. A method of producing a molded article, in which a polyvinyl chloride resin powder composition as prepared by dry-blending a plasticizer and a stabilizer with a polyvinyl chloride resin followed by incorporating from 1 to 5 parts by weight, to 100 parts by weight of the polyvinyl chloride resin, of a finely divided polyvinyl chloride resin having a viscosity average polymerization degree of from to 3000 to 4000 into the resulting dry blend is molded by rotational molding.

10. The method as claimed in claim 9, in which the finely divided polyvinyl chloride resin is one having a viscosity average polymerization degree of from 3500 to 4000.

11. The method as claimed in claim 9, in which the finely divided polyvinyl chloride resin is one having an average particle size of approximately from 0.1 to 10 μm.

12. The method as claimed in claim 9, in which the finely divided polyvinyl chloride resin is a finely divided vinyl chloride polymer or a finely divided copolymer composed of monomer(s) capable of copolymerizing with vinyl chloride, selected from the group consisting of ethylene, propylene or vinyl acetate, and vinyl chloride.

13. The method as claimed in claim 9, in which the finely divided polyvinyl chloride resin is one as prepared by emulsion polymerization or microsuspension polymerization.

14. The method as claimed in claim 9, in which the polyvinyl chloride resin is a vinyl chloride polymer, or a copolymer composed of monomer(s) capable of copolymerizing with vinyl chloride, selected from the group consisting of ethylene, propylene, vinyl acetate, alkyl acrylates or alkyl methacrylates, and vinyl chloride, or a graft copolymer formed by grafting vinyl chloride to an ethylene-vinyl acetate copolymer.

15. The method as claimed in claim 9, in which the polyvinyl chloride resin is one as prepared by suspension polymerization or bulk polymerization.

16. The method as claimed in claim 9, in which the polyvinyl chloride resin is one having an average particle size of approximately from 100 to 500 μm.

* * * * *